July 29, 1958 H. O. WOLCOTT 2,845,533

FREQUENCY MARKER PULSE CIRCUITS

Filed March 15, 1956 2 Sheets-Sheet 1

INVENTOR.
HENRY O. WOLCOTT

BY Harry R. Lubcke
AGENT

FREQUENCY MARKER PULSE CIRCUITS

Filed March 15, 1956 2 Sheets-Sheet 2

INVENTOR.
HENRY O. WOLCOTT
BY Harry R. Lubcke
AGENT

United States Patent Office 2,845,533

Patented July 29, 1958

2,845,533

FREQUENCY MARKER PULSE CIRCUITS

Henry O. Wolcott, Glendale, Calif., assignor, by mesne assignments, to International Telephone and Telegraph Corporation, a corporation of Maryland Application March 15, 1956, Serial No. 571,654

12 Claims. (Cl. 250—27)

My invention relates to means for forming a pulse at a selected frequency within a band of sequentially produced frequencies and particularly for use with frequency band sweeping means used with an oscilloscope to obtain a visual presentation of a circuit function with respect to frequency.

Sweep frequency oscillators are known in the art as very convenient means for adjusting audio and video frequency amplifiers, for testing loudspeakers, driving shake tables, and for measuring the frequency characteristics of filters, transformers and other devices. In such work an accurate frequency marker having a precise and invariable shape is much to be desired but has not been attained in the prior art.

To provide such a marker is an object of my invention.

Another object is to provide a marker which is unaffected in accuracy of frequency indication or in shape of pulse by variations of power supply voltage or by level of input signal.

Another object is to provide a marker which does not include tuned circuits.

Another object is to provide a marker which is operable over a wide frequency range, of the order of 10,000 to one.

Another object is to provide a marker which is relatively simple, employing essentially only vacuum tubes, resistors and capacitors, and which is correspondingly inexpensive, small and light weight.

Another object is to provide a marker the operation of which is independent of the rate of change of the frequency sweep.

Figure 1:
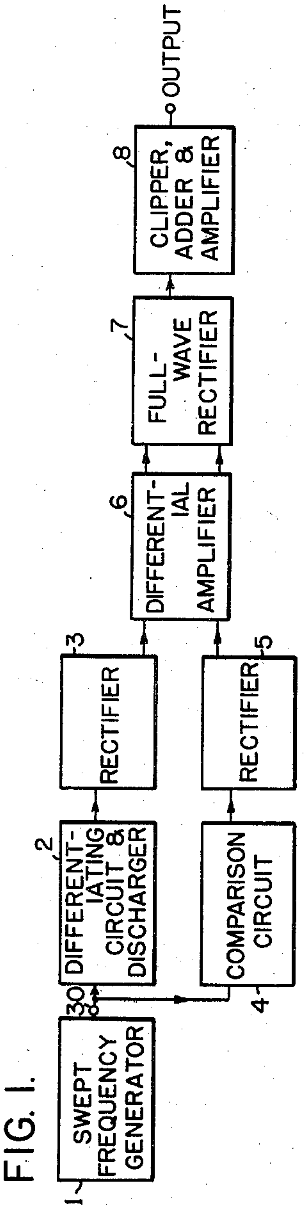
Figure 2:
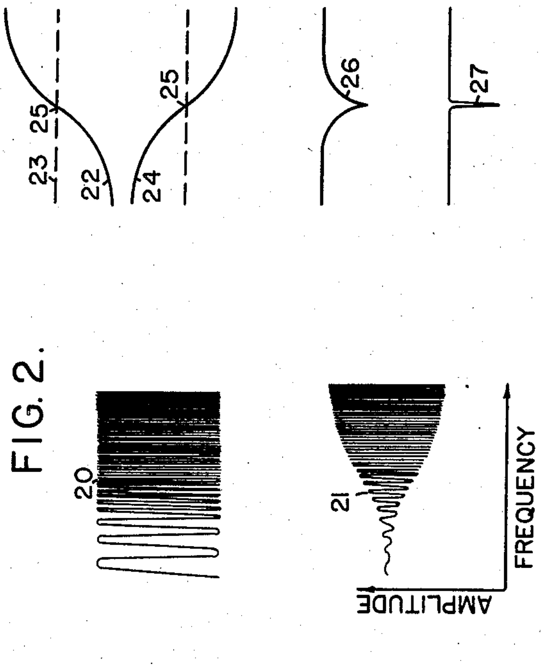
Figure 4:
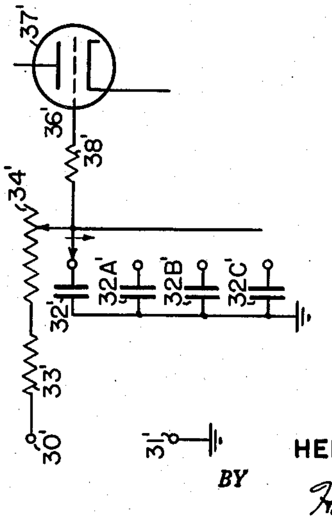
Figure 3:
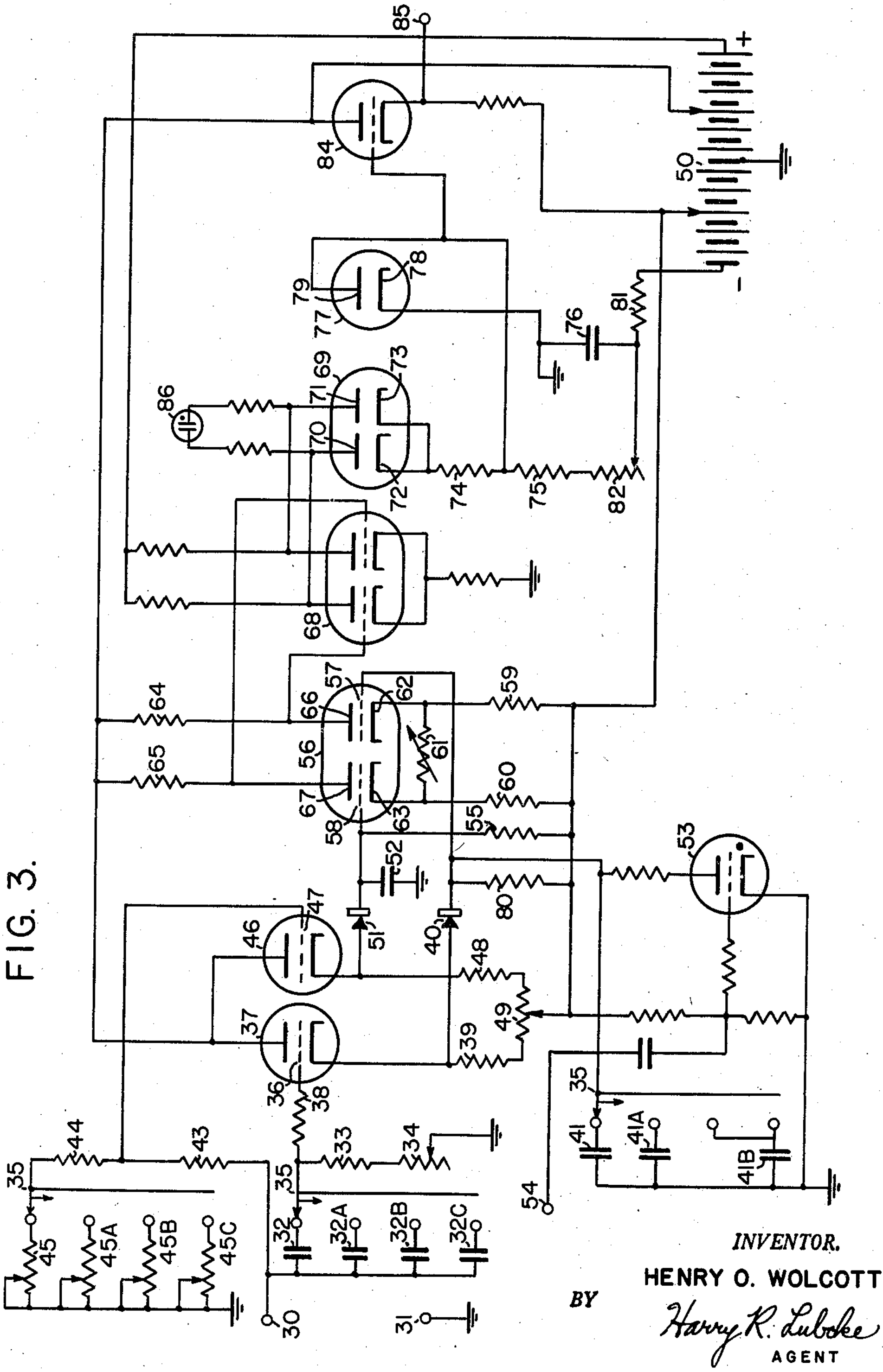

Other objects of my invention will become apparent upon reading the following detailed specification and upon examining the related drawings, in which:

Fig. 1 is a block diagram of my frequency marker pulse circuit including its relation to associated equipment, Fig. 2 is a graph indicating how the marker pulse is formed, Fig. 3 is the schematic diagram of my marker pulse circuit, and Fig. 4 is the partial schematic diagram of a modification of my marker pulse circuit.

Briefly, my marker pulse circuit functions as outlined in Figs. 1 and 2. The variable or unknown frequency which is to be identified by a pulse of electrical energy at a selected frequency originates in a swept frequency generator or in any other manner which is not a part of this invention. This entity is identified by numeral 1 in Fig. 1 and a typical swept frequency is represented at 20 in Fig. 2 as seen on an oscilloscope. This is a plot of amplitude of electrical energy, usually voltage as the principal parameter, as ordinate with time as abscissa. Because frequency increases with time in the plot shown and as a usual procedure frequency may also be considered as the abscissa. Any frequency range may be swept but an overall range of from 20 to 200,000 cycles can be accepted in a typical embodiment of my invention, or any lesser range, down to a few cycles.

In a typical embodiment a variation of amplitude with frequency is obtained in a differentiating circuit 2 of Fig. 1, that is, a capacitor of high capacitative reactance in series with a resistor of relatively low value of resistance, the output from the circuit being taken as the voltage across the resistor. This variation of amplitude is shown at 21 in Fig. 2. This is rectified at 3 in Fig. 1, giving the envelope 22 shown in Fig. 2. This voltage is retained during one sweep upon a capacitor. Means to discharge this capacitor at the end of the sweep are provided so that the value of this charge is repeated and does not become cumulative to inoperability.

The amplitude of the incoming signal 20 of Fig. 2 is separately established in the apparatus by comparison circuit 4 of Fig. 1. This is also rectified, by rectifier 5, and this envelope is the horizontal line 23 in Fig. 2. The important aspect here is that both envelopes 22 and 23 are derived from the same initial signal, thus the accuracy of frequency determination does not depend upon constancy of power supply voltage or upon any other parameter foreign to the incoming signal itself. Neither is the accuracy dependent upon the level of the incoming signal.

In order that the marker pulse be formed differential amplifier 6 is employed. This is also known as a cathode-coupled paraphase amplifier, the distinguishing characteristic of which is an automatic rise in output voltage at the output of one side of the duplicate amplifier chain for a fall in output voltage on the other side. At the output of differential amplifier 6, then, wave form 22 is obtained at one side and waveform 24 at the other.

These waveforms are conveyed to full-wave rectifier 7, where, in full wave rectifier fashion, an output is obtained whenever either of the plates are more positive than the common cathode. In this instance, waveform 24 is positive on one plate during the early portion of the waveform shown in Fig. 2, while waveform 22 is positive for the latter portion. Between the two there is a dip; i. e., near point 25, which represents the minimum value of output formed from the reduction of positive amplitude 24 and the subsequent positive rise of curve 22. This dip forms the negative excursion 26, which is the marker pulse.

Once formed, the pulse is combined in adder 8 with a negative potential to set the zero axis with respect to the peak of the negative pulse. All voltage excursions more positive are clipped off by the clipper, also in rectangle 8. A variable resistor control on the adder determines the extent of the negative swing with respect to ground of the pulse and so becomes the amplitude control of the marker pulse.

The details of my circuit are revealed in the schematic diagram of Fig. 3. The variable or unknown frequency is introduced as an alternating electrical voltage at terminals 30 and 31, the latter terminal being ground in the usual embodiments of the electronics art. Capacitor 32 and resistors 33 and 34 comprise the differentiating circuit. These elements accomplish the electrical equivalent of forming the first derivative of the calculus. Insofar as differentiation is concerned the two resistors are one, but in order to provide means for adjusting the frequency at which the marker occurs resistors 33 and 34 are each a portion of the total required value, the variable resistor preferably having the largest value to allow a wide range of frequency. The differentiated output appears as waveform 21 in Fig. 2, as has been previously mentioned.

In order that the circuit accommodate the wide frequency range possible with this device provision is made to change the value of capacitor 32 with a range change switch 35 in decade steps over a thousand to one range. The substitute capacitors are 32A, 32B and 32C.

The output of the differentiating circuit is impressed upon grid 36 of triode 37 through anti-oscillation resistor of low resistance value 38. This tube acts to take the differentiated output from the circuit without imposing a load thereon. From resistor 39 in the cathode thereof an output is taken to peak rectifier 40. The rectified output is accumulated in capacitor 41, and is the waveform 22 in Fig. 2. As before, capacitor 41 is changed to larger values for lower frequencies by the same range change switch 35, these being capacitors 41A and 41B.

A connection from terminal 30 is also taken to resistors of equal value 43 and 44. The circuit thereof is completed to ground (the equivalent of terminal 31) through variable resistor of low value 45. It should be noted that there is no differentiation in this circuit. In order that each of the previously mentioned ranges might be separately calibrated there are also provided separate variable resistors 45A, 45B and 45C which are connected in circuit by the previously mentioned range change switch 35 simultaneously with the changes in capacitors.

This circuit is similarly isolated from a rectifier which follows by another vacuum tube 46. The incoming signal, at half the amplitude of the signal impressed for differentiation, is applied to grid 47 of tube 46. The plate thereof, as the plate of companion tube 36, merely goes to the plate voltage supply. The cathode of tube 46 supplies the output, over resistor 48, as before. Potentiometer 49 is connected to both cathode resistors 39 and 48 for balancing purposes, with the slider arm connected to a negative tap on plate voltage supply 59. This supply is center-tapped with respect to ground to provide a potential sufficiently negative on all cathode follower tubes to allow signal excursions on such cathodes to go more negative than ground potential. Potentiometer 49 balances for the inescapable differences in characteristics of tubes 37 and 47.

The output from cathode resistor 48 is rectified by rectifier 51 and charges capacitor 52 to a potential half as high as that of capacitor 41. Resistor 55 acts to slowly discharge capacitor 52 so that any variation of amplitude of the output of rectifier 51 will be followed. Such variations would be caused by changes in the input signal level, for example. Rectifiers 40 and 51 may be of the germanium or silicon crystal type, or, of course, diode vacuum tubes.

Vacuum tube 53 is a gas triode, included to discharge capacitor 41 at the end of each frequency sweep so that the capacitor will be repeatedly charged over the same charge curve instead of asymptotically approaching a full charge after a few cycles of operation. The discharge is preferably initiated by a positive pulse impressed upon terminal 54, and hence the grid of tube 53, said pulse being taken from the circuit initiating the sweeps of a swept frequency oscillator, from the deflection circuit of an oscilloscope with which the marker circuit is operated or derived by differentiation or equivalent ways from the signal under study. The resistors associated with the gas triode prevent excessive discharge currents therein according to known technique.

When my device is used to statically measure a frequency the hand adjusted frequency variation is sufficiently slow so that resistors 55 and 80 discharge capacitors 52 and 41.

The first tube of differential amplifier 6 of Fig. 1 is double triode 56. The rectified differentiated envelope 22 is impressed upon grid 57 and the steady state potential of half signal amplitude curve or envelope 23 of Fig. 2 is impressed upon grid 58. Fairly high value resistor 59 is in the cathode circuit of one triode and resistor 60 of equal value is in the cathode circuit of the other.

Joint cathode resistor 61 plays an important part in the waveforms which follow. It is here that inverse waveform 24 is formed from waveform 22. Assume that the resistance at which variable resistor 61 is set is small with respect to the resistance of cathode resistors 59 and 60. This results in essentially a single cathode circuit since any inequality of individual cathode current is bypassed to the opposite cathode resistor. Thus the potentials of cathodes 62 and 63 are essentially the same regardless of the potentials on the corresponding grids 57 and 58. It will be recalled that waveform 22 is impressed upon grid 57 and constant amplitude waveform 23 upon grid 58. As grid 57 becomes less negative and nearer zero grid potential the cathode current from cathode 62 increases, thus the potential of cathode 62 becomes more positive. This also causes cathode 63 to become more positive. With a constant potential on grid 58 the grid to cathode potential difference increases, hence the current through this triode decreases. Plate resistors 64 and 65 are preferably equal, hence the potential of plate 67 increases an amount equal to the decrease of potential of plate 66 and the inverse curves previously mentioned are formed.

Double triode 68 and associated resistors comprise the same type of differential amplifier as tube 56 and the two are direct coupled. The second tube is utilized to increase the amplification of the signal to a desirable level to operate full wave rectifier 69.

The two plates 70 and 71 of rectifier 69 are provided with the amplified waveforms 22 and 24 of Fig. 2, while the two cathodes 72 and 73 are connected together at a common cathode resistor composed of resistors 74, 75 and 82. The latter is also connected to the negative below-ground end of voltage supply 50 to establish the negative potential required for the adder function which will be detailed later. Capacitor 76 and resistor 81 comprise an RC filter for voltage supply 50.

The signal across cathode resistor 74, 75 and 82 consists of the most positive contribution from either plate 70 or plate 71. Comparing curves 22 and 24 of Fig. 2, it is noted that curve 24 is initially most positive. Hence the voltage across the cathode resistor will follow curve 24 down to point 25, at which point curve 22 becomes more positive than curve 24 and so the voltage across the cathode resistor rises according to the latter part of curve 22, i. e., to the right of point 25. Consequently, the resulting cathode resistor voltage is curve 26 of Fig. 2.

This curve does not appear very sharp. It represents the situation where the amplification of the differential amplifier is a minimum, as by variable resistor 61 being adjusted to a maximum value, the differential gain being thereby decreased as was explained. When resistor 61 is adjusted to a substantially zero resistance value the differential amplification process previously explained is a maximum. This results in curves 22 and 24 having very steep sides near point 25 and essentially saturated values at points beyond in both directions. Pulse 27 of Fig. 2 is then produced, which is representative of the usually desired pulse shape.

This completes the description of how the marker pulse is formed at a selected frequency within the frequency range swept. For instrument use and for other purposes it is desirable that the pulse be clamped to a given potential, usually ground or zero potential, and that means be provided for adjusting the amplitude of the pulse to that desired in any instance. The latter is accomplished by means of variable resistor 82, which alters the overall value of the resistance in the cathodes 72 and 73 circuit of rectifier 79. The former is accomplished by the connection of resistor 82 to the negative voltage of supply 50. This causes the absolute potential of pulse 27 to be largely more negative than ground potential.

Diode 77, with cathode 78 grounded and plate 79 connected to the junction of prior cathode resistors 74 and 75 shorts to ground any positive excursions of the waveform output from rectifier 69. This amounts to cutting off the base (the upper part) of pulse 27 at various levels depending upon the amplitude of the pulse. Thus, variable resistor 82 is the output amplitude control and diode 77 insures that the pulse excursion shall be from ground potential.

Triode 84 is a cathode follower output amplifier, direct coupled to the rectifier-diode chain which precedes it. This gives a low impedance output at output terminal 85, a usually desirable characteristic and also one which prevents any unusual connection of further apparatus from having an influence upon the prior pulse-forming circuits.

Gaseous tube 86 is a refinement in the operation of the marker circuit in that it glows when the device is in usual operation but is extinguished when the frequency dial is set to the same dial reading as a fixed electrically introduced frequency. The frequency dial is attached to the variable arm of resistor 34. This functioning is normally used in calibrating. A known frequency is electrically introduced at input terminal 30 and the frequency dial turned to that frequency. Gaseous tube 86 should then be automatically extinguished. If this does not occur, the calibrating adjustment for the range involved; i. e., variable resistor 45, 45A, 45B or 45C, is adjusted until the tube is extinguished.

This tube is also utilized to determine the frequency of an unknown but constant frequency oscillation introduced at terminal 30. When the frequency dial is set to the electrically introduced (non-varying) frequency, each of the rectifiers in envelope 69 operates at the same potential; that of point 25 in Fig. 2. There is thus no plate voltage difference across the electrodes of tube 86 and so it is extinguished.

It will be recognized that my marker circuit possesses an important characteristic, in that the width in cycles of the frequency marker pulse is always a constant percent of the frequency being measured. This is very convenient as compared to a pulse of fixed width in time or in cycles. The pulse of my marker gives uniform resolution over all frequency ranges and its size and shape is independent of the rate of change of frequency over the sweep.

Vacuum tube heater connections to cathodes, being conventional, have been omitted from Fig. 3 for clarity. Similarly, battery 50 may be composed of a pair of regulated power supplies, one with the negative terminal grounded and the other with positive terminal grounded.

Certain variations of my circuit are possible. For a single frequency range of only one decade only one differentiating capacitor and set of auxiliary components are required; i. e., range switch 35 and all the "A, B, C" identified components are not required.

Multigrid tubes may take the place of the triodes shown and crystal diodes may replace vacuum tube diodes and vice versa.

For the circuit of Fig. 3 with differentiating means 32, 33 etc. an ascending frequency sweep is used, as shown in Fig. 2. The instantaneous frequency of the sweep oscillator increases with time and then very quickly returns to the lowest frequency to repeat the sweep.

An important alternate consists of employing calculus integrating means and a descending frequency sweep. The altered circuit is shown in Fig. 4. The calculus circuit elements have been interchanged. Resistors 33′ and 34′ are in series with the input terminal 30′, while capacitors 32′, 32A′, 32B′ or 32C′ are in shunt to ground. Vacuum tube 37′ and other elements are the same as the corresponding ones in Fig. 3. In fact, a simple multi-pole double throw switch can be included in Fig. 3 to accomplish the modification to Fig. 4 at will. Should harmonic distortion be present in the swept frequency generator it will be doubled in the circuit of Fig. 3, but halved in the circuit of Fig. 4.

It will be recognized as a matter of terminology that the functions performed by elements 32 and 33 or 32′ and 33′ are electrical representations of the mathematical processes of differentiation and integration of calculus.

Various changes in circuit details, operating characteristics of components and frequencies measured may be made in my circuit without departing from the scope of my invention as set forth in the following claims.

Having now fully described my invention and the manner in which it is to be practiced, I claim:

1. A circuit for forming a pulse of electrical energy at a selected frequency in a band of sequentially produced frequencies of alternating electrical energy comprising calculus-function-producing elements to form an amplitude of electrical energy proportional to a continuous first order calculus function of said band of frequencies, first means connected to said elements to form the envelope of said first order calculus function, a periodic second means to form the envelope of said sequentially produced frequencies, differential means connected to said first means and to said second means to form variations of electrical energy having inverse amplitudes as a continuous function of said sequentially produced frequencies, and means connected to the output of said differential means to form a pulse of electrical energy at the frequency at which the difference between said inverse amplitudes is a minimum.

2. A circuit for forming a pulse of electrical energy at a selected frequency in a band of sequentially produced frequencies of alternating electrical energy comprising electrical differentiating elements to form an amplitude of electrical energy proportional to the continuous derivative function of said band of frequencies, first means connected to said elements to form the envelope of said derivative electrical energy, a periodic second means to form the envelope of said sequentially produced frequencies, differential means connected to said first means and to said second means to form variations of electrical energy having inverse amplitudes as a continuous function of said sequentially produced frequencies, and means connected to the output of said differential means to form a pulse of electrical energy at the frequency at which the difference between said inverse amplitudes is a minimum.

3. A circuit for forming a pulse of electrical energy at a selected frequency in a band of sequentially produced frequencies of alternating electrical energy comprising electrical integrating elements to form an amplitude of electrical energy proportional to the continuous integral function of said band of frequencies, first means connected to said elements to form the envelope of said integral electrical energy, aperiodic second means to form the envelope of said sequentially produced frequencies, differential means connected to said first means and to said second means to form variations of electrical energy having inverse amplitudes as a continuous function of said sequentially produced frequencies, and means connected to the output of said differential means to form a pulse of electrical energy at the frequency at which the difference between said inverse amplitudes is a minimum.

4. A circuit for forming a pulse of electrical energy at a selected frequency in a band of sequentially produced frequencies of alternating electrical energy comprising electrical differentiating elements to form an amplitude of electrical energy proportional to the continuous derivative function of said band of frequencies, first means connected to said elements to form the envelope of said derivative electrical energy, aperiodic second means to form the envelope of said sequentially produced frequencies, differential means having inputs and an output, one input connected to said first means and another to said second means to form variations of electrical energy having inverse amplitudes as a continuous function of said sequentially produced frequencies, and means connected to the output of said differential means to form a pulse of electrical energy at the frequency at which said inverse amplitudes are equal.

5. A circuit for forming a pulse of electrical energy at a selected frequency in a band of sequentially produced frequencies of alternating electrical energy comprising electrical integrating elements to form an amplitude of electrical energy proportional to the continuous integral function of said band of frequencies, first means connected to said elements to form the envelope of said integral electrical energy, aperiodic second means to form the envelope of said sequentially produced frequencies, differential means having inputs and an output, one input connected to said first means and another to said second means to form variations of electrical energy having inverse amplitudes as a continuous function of said sequentially produced frequencies, and means connected to the output of said differential means to form a pulse of electrical energy at the frequency at which said inverse amplitudes are equal.

6. A circuit for forming a pulse of electrical energy at a selected frequency in a band of sequentially produced frequencies of alternating electrical energy comprising electrical differentiating elements to form an amplitude of electrical energy proportional to the continuous first derivative function of said band of frequencies, first means connected to said elements to form the amplitude envelope of said first derivative electrical energy, aperiodic second means to form the amplitude envelope of said sequentially produced frequencies, differential means having two inputs and an output, one input connected to said first means and the other to said second means to form variations of electrical energy having inverse amplitudes as a continuous function of said sequentially produced frequencies, and means connected to the output of said differential means to form a pulse of electrical energy at the frequency at which said inverse amplitudes are equal.

7. A circuit for forming a pulse of electrical energy at a selected frequency in a band of sequentially produced frequencies of alternating electrical energy comprising electrical integrating elements to form an amplitude of electrical energy proportional to the continuous integral function of said band of frequencies, first means connected to said elements to form the amplitude envelope of said integral electrical energy, aperiodic second means to form the amplitude envelope of said sequentially produced frequencies, differential means having two inputs and an output, one input connected to said first means and the other to said second means to form variations of electrical energy having inverse amplitudes as a continuous function of said sequentially produced frequencies, and means connected to the output of said differential means to form a pulse of electrical energy at the frequency at which said inverse amplitudes are equal.

8. An electrical circuit for forming a pulse of electrical energy at a selected frequency in a band of sequentially-produced different frequencies of alternating electrical energy comprising calculus-function-producing elements to form an amplitude of electrical energy proportional to a continuous first order calculus function of said band of frequencies, a first means connected to said elements to form the amplitude envelope of said first order calculus function, discharge means connected to said first means to allow recycling thereof, an untuned second means to form the amplitude envelope of said sequentially produced frequencies, differential means having two inputs and an output, one input connected to said first means and the other to said second means to form two variations of electrical energy having inverse amplitudes as a continuous function of said sequentially produced frequencies, and means connected to the output of said differential means to form a pulse of electrical energy at the frequency at which said inverse amplitudes are equal.

9. An electronic circuit for forming a pulse of electrical energy at a selected frequency in a band of sequentially-produced different frequencies of alternating electrical energy comprising a calculus-function-producing pair of elements to form an amplitude of electrical energy proportional to a continuous first order calculus function of said band of frequencies, one element of said pair being adjustable to select the frequency at which said pulse shall be formed, a first chargeable means connected to said pair of elements to form the amplitude envelop of said first order calculus function, discharge means connected to said first chargeable means to allow recycling thereof, an aperiodic second chargeable means to form the amplitude envelope of said sequentially produced frequencies, differential means having two inputs and an output, one input connected to said first chargeable means and the other to said second chargeable means to form two variations of electrical energy having inverse amplitudes as a continuous function of said sequentially produced frequencies, means connected to the output of said differential means to form a pulse of electrical energy at the frequency at which said inverse amplitudes are equal, and adjusting means connected to the means to form a pulse to alter the amplitude of said pulse.

10. An electronic circuit for forming a pulse of electrical energy at a selected frequency in a band of sequentially-produced different frequencies of alternating electrical energy comprising a capacitor-resistor calculus-function-producing pair of elements to form an amplitude of electrical energy proportional to a first order calculus function of said band of frequencies, said resistor being adjustable to select the frequency at which said pulse shall be formed, a first electrical rectifying-charge accumulating means connected to said pair of elements to form the amplitude envelope of said first order calculus function, discharge means connected to said first accumulating means to reduce the charge thereon to a low value once for each sequence of frequencies produced; a second electrical rectifying-charge accumulating means to form the amplitude envelope of said sequentially produced frequencies, a differential amplifier having two inputs and an output, one input connected to said first accumulating means and the other to said second accumulating means to form two variations of electrical energy having inverse amplitudes as a function of said sequentially produced frequencies, a rectifier connected to the output of said differential amplifier to form a pulse of electrical energy at the frequency at which said inverse amplitudes are equal, an adjustable resistor in the cathode circuit of said rectifier, a diode connected across said adjustable resistor, said adjustable resistor adapted to alter the amplitude of said pulse of electrical energy and said diode adapted to maintain the resting axis of said pulse at ground potential regardless of the amplitude thereof.

11. An electronic circuit for forming a pulse of electrical energy at a selected frequency in a band of sequentially-produced different frequencies of alternating electrical energy comprising a capacitor-resistor calculus-function-producing pair of elements to form an amplitude of electrical energy proportional to a first order calculus function of said band of frequencies, said resistor being adjustable to select the frequency at which said pulse shall be formed, a first means connected to said pair of elements to amplify the output of the same without imposing a load thereupon, a first rectifier connected to said first means, a first capacitor connected to said first rectifier, the first rectfiier-capacitor combination adapted to form the amplitude envelope of said first order calculus function, discharge means connected to said first capacitor to reduce the charge thereon to a low value once for each sequence of frequencies produced; a second means to amplify a fraction of the amplitude of the band of sequentially produced frequencies of alternating electrical energy, a second rectifier connected to said second means, a second capacitor connected to said second rectifier, the second rectifier-capacitor combination adapted to form the amplitude envelope of said sequentially produced frequencies, a differential amplifier having two inputs and an output, one input connected to said first capacitor and the other to said second capacitor to form two variations of electrical energy having inverse amplitudes as a function of said sequentially produced frequencies, a full-wave rectifier connected to the output of said differential amplifier to form a pulse of electrical energy at the frequency at which said inverse amplitudes are equal, an adjustable resistor in the cathode circuit of said full-wave rectifier, said adjustable resistor connected to a source of voltage negative with respect to ground, a diode connected across said adjustable resistor, said adjustable resistor adapted to alter the amplitude of said pulse of electrical energy and said diode adapted to maintain the resting axis of said pulse at ground potential regardless of the amplitude thereof.

12. An electronic circuit for forming a pulse of electrical energy at a selected frequency in a band of sequentially-produced different frequencies of alternating electrical energy comprising a capacitor-resistor calculus-function-producing pair of elements to form an amplitude of electrical energy proportional to a first order calculus function of said band of frequencies, said resistor being adjustable to select the frequency at which said pulse shall be formed, a first vacuum tube connected to said pair of elements to amplify the output of the same without imposing a load thereupon, a first rectifier connected to said first vacuum tube, a first capacitor connected to said first rectifier, the first rectifier-capacitor combination adapted to form the amplitude envelope of said first order calculus function, a gaseous tube connected to said first capacitor to reduce the charge thereon to a low value once for each sequence of frequencies produced; a second vacuum tube to amplify a fraction of the amplitude of the band of sequentially produced frequencies of alternating electrical energy, a second rectifier connected to said second vacuum tube, a second capacitor connected to said second rectifier, the second rectifier-capacitor combination adapted to form the amplitude envelope of said sequentially produced frequencies, a twin triode differential amplifier having two input electrodes and an output, one input electrode connected to said first capacitor and the other to said second capacitor to form two variations of electrical energy having inverse amplitudes as a function of said sequentially produced frequencies, a full-wave rectifier connected to the output of said differential amplifier to form a pulse of electrical energy at the frequency at which said inverse amplitudes are equal, an adjustable resistor in the cathode circuit of said full-wave rectifier, said adjustable resistor connected to a source of voltage negative with respect to ground, a diode connected across said adjustable resistor with the cathode to the negative end thereof, said adjustable resistor adapted to alter the amplitude of said pulse of electrical energy and said diode adapted to maintain the resting axis of said pulse at ground potential regardless of the amplitude thereof, and a cathode-follower output amplifier connected to said diode.

References Cited in the file of this patent

UNITED STATES PATENTS

| | | |
|---|---|---|
| 2,448,526 | Gross | Sept. 7, 1948 |
| 2,478,683 | Bliss | Aug. 9, 1949 |
| 2,523,115 | Herst et al. | Sept. 19, 1950 |
| 2,598,491 | Bergfors | May 27, 1952 |
| 2,640,926 | Wu | June 2, 1953 |
| 2,762,263 | Schmitt | Sept. 11, 1956 |
| 2,763 830 | Pihl | Sept. 18, 1956 |
| 2,780,724 | Fickett | Feb. 5, 1957 |
| 2,796,556 | Larew | June 18, 1957 |